(12) United States Patent
Donaldson et al.

(10) Patent No.: US 11,857,890 B2
(45) Date of Patent: Jan. 2, 2024

(54) RECHARGEABLE INTERACTIVE TOY

(71) Applicant: LEGO A/S, Billund (DK)

(72) Inventors: Thomas Alan Donaldson, Billund (DK); Mark Ross Champkins, Billund (DK); Radost Radoslavova Kerefeyna, Billund (DK); Rasmus Bissenbakker Kærsgaard, Billund (DK); Yufan Wei Wang, Billund (DK); Arun Venkatasubramanian, Tanjong Rhu (SG); Simon Mark Jordan, Upper Cambourne (GB); Andrew James Knights, Huntington Cambridgeshire (GB); Isobel Jane Ashbey, Cambridge (GB); Martin Edward Brock, Cambridge (GB); Rosanna Elizabeth Parrish, Cambridge (GB); Silviu Toma, Cambridge Cambridgeshire (GB); Robert George Milner, Hilton Cambridgeshire (GB)

(73) Assignee: LEGO A/S, Billund (DK)

(*) Notice: Subject to any disclaimer, the term of this patent is extended or adjusted under 35 U.S.C. 154(b) by 268 days.

(21) Appl. No.: 17/436,566

(22) PCT Filed: Dec. 12, 2019

(86) PCT No.: PCT/EP2019/084874
§ 371 (c)(1),
(2) Date: Sep. 3, 2021

(87) PCT Pub. No.: WO2020/192955
PCT Pub. Date: Oct. 1, 2020

(65) Prior Publication Data
US 2022/0143524 A1    May 12, 2022

(30) Foreign Application Priority Data
Mar. 22, 2019  (DK) ............................. PA201970179

(51) Int. Cl.
*A63H 33/26* (2006.01)
*A63H 33/04* (2006.01)

(52) U.S. Cl.
CPC ........... *A63H 33/26* (2013.01); *A63H 33/042* (2013.01); *A63H 2200/00* (2013.01)

(58) Field of Classification Search
CPC ........................... A63H 33/26; A63H 2200/00
See application file for complete search history.

(56) References Cited

U.S. PATENT DOCUMENTS

| 8,330,284 B2 | 12/2012 | Weston et al. |
| 2011/0263330 A1 | 10/2011 | Weston et al. |

(Continued)

FOREIGN PATENT DOCUMENTS

| CN | 102232000 A | 11/2011 |
| CN | 103977558 A | 8/2014 |

(Continued)

OTHER PUBLICATIONS

First Office Action issued in corresponding Chinese Patent Application No. 201980094477.1, dated Jul. 18, 2022, 6 pages (English translation only).

(Continued)

*Primary Examiner* — John A Ricci
(74) *Attorney, Agent, or Firm* — Day Pitney LLP; Anthony A. Kassas

(57) ABSTRACT

An interactive toy, system, and method of controlling the same. The interactive toy includes a toy housing comprising therein a function device performing user-perceptible, controllable functions; a control circuit controlling the function device; a rechargeable power source providing operating power to the function device and the control circuit; and a charging circuit for contactless receipt of electrical energy and for charging the rechargeable power source when the (Continued)

interactive toy is positioned in a charging zone of a contactless charging device. The control circuit receives a primary signal indicative of an interaction stimulus; a secondary signal indicative of a position of the interactive toy with respect to the charging zone; and, responsive to the primary signal, controls the function device to perform a user-perceptible function selected based on the secondary signal. The interactive toy system includes an interactive toy and a contactless charging device defining one or more charging zones.

16 Claims, 5 Drawing Sheets

(56) References Cited

U.S. PATENT DOCUMENTS

| | | | | |
|---|---|---|---|---|
| 2014/0290360 | A1* | 10/2014 | Binder | A63H 5/00 73/493 |
| 2015/0077065 | A1 | 3/2015 | Haseltine et al. | |
| 2015/0283470 | A1 | 10/2015 | Hooper et al. | |
| 2016/0256792 | A1 | 9/2016 | Mowbray et al. | |
| 2018/0280822 | A1 | 10/2018 | Murthy et al. | |
| 2022/0100281 | A1* | 3/2022 | Nocon | G06V 40/28 |
| 2022/0330857 | A1* | 10/2022 | Grubb | A61B 5/1455 |

FOREIGN PATENT DOCUMENTS

| | | |
|---|---|---|
| CN | 205516505 U | 8/2016 |
| CN | 106474735 A | 3/2017 |
| JP | 2019005424 A | 1/2019 |
| WO | 2018/052001 A1 | 3/2018 |

OTHER PUBLICATIONS

First Technical Examination Report from priority Danish patent application No. PA 201970179, dated Sep. 20, 2019, 9 pages.

International Preliminary Report on Patentability issued in corresponding International patent application No. PCT/EP2019,084874, dated Mar. 11, 2021, 54 pages.

International Search Report and Written Opinion issued in corresponding International patent application No. PCT/EP2019/084874, dated Apr. 20, 2020, 9 pages.

* cited by examiner

RECHARGEABLE INTERACTIVE TOY

CROSS-REFERENCE TO RELATED APPLICATIONS

This application is a U.S. national stage application under 35 U.S.C. 371 of co-pending International Application No. PCT/EP2019/084874 filed on Dec. 12, 2019, which in turn claims priority to DK Patent Application No. PA 2019 70179 filed on Mar. 22, 2019, the contents of which are incorporated by reference herein in their entirety for any purpose whatsoever.

The present invention relates in one aspect to an interactive toy comprising a rechargeable power source. In a particular aspect, the interactive toy is a modular interactive toy element. In a further aspect, the invention relates to a toy system comprising one or more interactive toys, each interactive toy comprising a rechargeable power source. In a yet further aspect the invention relates to a method of controlling the output of an interactive toy comprising a rechargeable power source.

BACKGROUND OF THE INVENTION

Interactive toys allow for an enhanced play experience for a user of the toy, typically by performing a user-perceptible function in response to a user interaction. Modular interactive toy elements may bring such an enhanced play experience to a new level allowing for combining the modular interactive toy elements with each other to construct a larger variety and complexity of user-perceptible functions performed by such a combination, amongst others. One of the primary challenges in this context is supplying electrical power to the interactive toy elements in a manner, which is safe, reliable and durable, in particular in view of a use by children of all ages, and where the toy has to be easy and intuitive to use, to build, and to play with.

To support freedom and flexibility of interactive play, in particular when using modular interactive toy elements, each of the interactive toy elements may be provided with an autonomous power source, including an electrical power storage device, such as a rechargeable battery. Furthermore, contactless charging for recharging the electrical power storage device is a convenient technology in this context, as it is easy to use for the user, and avoids the need for wired connections between a charger and the electronic device to be charged.

Modular interactive toys including a rechargeable power storage device have previously been disclosed, e.g. in co-pending International patent application no. PCT/EP2019/084779, which is hereby incorporated by reference. Furthermore, for example, a contactless energy transfer system for transferring electrical power to one or more electronically enhanced toy construction elements or other electronic devices is disclosed in co-pending International patent application no. PCT/EP2019/084808, which is hereby incorporated by reference. The same patent application further discloses a wireless inductive charging toy comprising a transmitting induction coil or loop creating an alternating magnetic field, and a toy body, wherein the toy body comprises a rechargeable battery, an electrical load, and an inductive charging circuitry comprising a receiving induction coil for converting the alternating magnetic field into electric current for charging the rechargeable battery.

CN utility model no. 205516505U discloses a toy having a number of separate interactive function modules each comprising a rechargeable battery and an inductive charging circuitry adapted for charging the modules. The toy also comprises a base forming a number of separate transmitting induction coils mutually arranged at a distance from each other so that each module may be placed upon each one of the separate induction coils for charging the module. When the function modules are all charged, then they may be used away from the charging base, until they are discharged and therefore need recharging. Recharging thus interrupts the play and the play experience is directly affected by the charging cycles of the rechargeable batteries in each of the interactive modules.

It is, therefore, desirable to improve continuity of the play experience when playing with rechargeable interactive toys.

WO 2010/059884 A1 discloses an inductively powered toy vehicle and an associated track with inductive charging segment. The vehicle may include a secondary coil, a drive motor, an electrical power storage device connected between said secondary coil and said drive motor, and a wireless communications unit. The charging segment may include a primary coil operable to transfer electrical power to the secondary coil when the vehicle traverses the charging segment. The vehicle drive motor may be operable at first and second speed settings, and a remote control device can provide operating instructions to the vehicle wireless communications unit. In one embodiment, the speed settings of the vehicle may be controlled automatically instead of interactively, based on a detected signal associated with a portion of a track, for example, an inductively powered track segment. However, while being adapted for continued recharging, the toy vehicle of WO 2010/059884 A1 is typically either confined to operation on looped tracks or the charging interrupts the play experience.

US 2017/182407 discloses a system and method for recharging a battery in an augmented reality game system. The augmented reality game system includes a mobile device and a remotely controlled drone. The mobile device is programmed to display an augmented reality environment, being the real environment viewed by the camera and a virtual environment superimposed over images of the real environment. The drone is controlled via commands transmitted wirelessly by the mobile device. The mobile device is programmed to execute a video game, which includes activities requiring a player to control the drone in relation to the augmented environment displayed on the mobile smart device video screen. The drone is powered by a rechargeable battery, and the video game includes activities that keep the player occupied with the game whilst the drone's rechargeable battery recharges. However, the system and method of US 2017/182407 does not overcome the interruption of the play experience with the physical toy. Instead, the system and method of US 2017/182407 circumvents the issue by entertaining the user with a virtual game play to fill out the waiting time of the interruption due to charging.

U.S. Pat. No. 8,330,284 B2 discloses a wirelessly-chargeable input device for a gaming platform of the type comprising a live-action game, computer game, video game, home gaming console or hand-held game unit. The wirelessly-chargeable input device is configured and adapted to produce light, vibration or sound effects in response to a received game output signal.

US 2015/0077065 A1 discloses methods and a system for the recharging of battery-operated devices, whereby the recharging process is made less burdensome and inconvenient to the users of the devices. Embodiments provide for incorporating recharging into the normal usage patterns for the devices using activities consistent with predetermined intended usage of the devices, thereby causing the user to perceive less inconvenience. Other embodiments provide for systematically detecting and wirelessly recharging devices, whereby the burden to the users may be reduced or entirely eliminated.

Therefore, it is still desirable to improve continuity of the interactive play experience, when playing with rechargeable interactive toys, beyond a single recharging cycle. In particular, it is still desirable to improve continuity of the physical interactive play experience beyond a single recharging cycle when playing with rechargeable interactive toys. Furthermore, it is desirable to improve the interactive play experience in regard of interactive toy elements, each comprising a rechargeable electrical power storage device, which are shaped and dimensioned for manual handling by a child, such as modular interactive toy elements intended for enhanced model construction and role-play. Also here, an improved continuity of the physical interactive play experience is particularly desirable.

SUMMARY OF THE INVENTION

Object of the present invention is to overcome at least some of the above-mentioned disadvantages of the prior art, or at least provide an alternative.

According to one aspect, the object is achieved by an interactive toy according to independent claim 1 with advantageous embodiments as defined by the dependent claims and disclosed herein. A particular aspect relates to embodiments where the interactive toy is an interactive modular toy element, which may be releasably connected with further modular toy elements to construct models with interactive functionality, or to enhance toy models constructed from conventional modular toy elements with interactive functionality. According to a further aspect, the object is achieved by an interactive toy system according to claim 8 with advantageous embodiments as defined by the corresponding further dependent claims and disclosed herein. According to a further aspect, the object is achieved by a method of controlling an interactive toy according to independent claim 12 with advantageous embodiments as defined by the dependent claims and disclosed herein.

According to some embodiments, the object is achieved by an interactive toy, comprising a toy housing and, accommodated in said toy housing:
 a function device for performing user-perceptible, controllable functions;
 a control circuit for controlling the function device;
 a rechargeable power source for providing operating power to the function device and the control circuit; and
 a charging circuit for contactless receipt of electrical energy and for charging the rechargeable power source when the interactive toy is positioned in a charging zone of a contactless charging device;
wherein the control circuit is configured to:
 receive a primary signal indicative of an interaction stimulus;
 receive a secondary signal indicative of a position of the interactive toy with respect to the charging zone; and,
 responsive to the primary signal, control the function device to perform a user-perceptible function, wherein the user-perceptible function is selected based on the secondary signal.

The interactive toy comprises a function device, typically an electronic function device. A function device may be any suitable device for performing one or more functions, including at least a function that provides a user-perceptible effect, such as a visible, audible, and/or tactile effect. The functions may be controlled, typically in response to a control signal applied to the function device. Examples of function devices may include any suitable mechanical, electrical and/or optical device, arrangement, and/or circuitry adapted to perform one or more mechanical, electrical and/or optical functions.

Examples of a mechanical function that some embodiments of a function device can perform include: driving a rotatable output shaft, winding up a string or a chain, which enables pulling an object closer to an electronic device, moving a hinged part of the electronic device, etc. The mechanical function may thus enable opening or closing a door, ejecting an object, rotating a turntable, moving a linear actuator, etc. Such mechanical motions can be driven by an electric motor.

Examples of a user perceptible electrical and/or optical function that some embodiments of a function device can perform include emitting constant or blinking light, activating several lamps in a predetermined sequence, emitting audible sound such as beep, alarm, bell, siren, voice message, music, synthetic sound, natural or imitated sound simulating and/or stimulating play activities, playback of a sound, and/or other audio content, displaying or projecting analogue or digital image information or video information, etc.

Accordingly, the function device may be selected from a motor (e.g. for actuating a rotating or a translating shaft, a vibrator device, or any other kind of mechanical actuator), a light source (e.g. one or more LEDs), an image or video display device, and a sound source (e.g. a loudspeaker). In some embodiments the interactive toy includes: a first electronic device comprising a first type of function device, e.g. a motor; and a second electronic device comprising a second type of function device, e.g. a light source or a sound source, different from the first type of function device (e.g. for providing a different physical effect than the first function device).

The control circuit is adapted to receive input signals, and in response to the input signal produce a control signal adapted to control the function device. For example, the control circuit may be an analogue signal processor, digital signal processor, and/or a programmable processor with associated storage and software implementing the required specific functionality of the control circuit according to any of the embodiments herein.

The rechargeable power source may be any suitable rechargeable power source, such as a fixed or replaceable rechargeable battery, a capacitor, or other electrical energy storage device.

The charging circuit may be any circuit adapted for contactless receipt of electrical energy, e.g. a circuit comprising a conductive loop or other resonant element configured to be energized by, and harvest energy from, a time-varying electromagnetic field. Furthermore, the charging circuit is for charging the rechargeable power source, e.g. by transferring harvested energy to the rechargeable electrical energy storage in the interactive toy.

For the purpose of the present disclosure, the term contactless or wireless is intended to refer to energy transfer from one device to another device without a physical, conductive coupling, i.e. without transfer of electrical energy by means of physical contact via a conductive medium that is conductive for a direct current. It will be appreciated that the term contactless merely characterises the energy transfer and does not exclude that the devices are otherwise physically connected with each other. In particular, two devices may be in physical contact with each other, e.g. mechanically interconnected with each other by means of respective coupling members, while the energy transfer between them is contactless, i.e. does not rely on the physical contact as a carrier for the transfer of energy or data.

Embodiments of a charging device for contactless energy transfer may comprise: an energy source device comprising a housing and, accommodated within the housing, an energy transfer circuit; and a one or more energy distribution devices, each configured to provide respective one or more external conductive loops defining a respective energy transfer zone in a proximity of the respective one or more external conductive loops. The energy transfer zones are for charging interactive toys when these are placed inside the energy transfer zone and may thus be referred to as a "charging zone".

A charging zone describes a geometrically defined region where a charging device can provide charging power to compatible rechargeable devices. The presence of a charging zone indicates the availability of charging power within said region, i.e. within the charging zone. The secondary signal (charging zone signal) is thereby indicative of a charging activity of the interactive toy, wherein charging occurs when the interactive toy is inside, or within reach of the charging zone, and wherein no charging occurs when the interactive toy is outside, or out of reach of the charging zone.

The primary signal is an interaction stimulus signal. The interaction stimulus may be a user-generated input. The interaction stimulus may also be a sensor signal from a sensor detecting an interaction with a play environment. Further, the interaction stimulus may also be an interaction between the interactive toy element and a further toy element, e.g. a further interactive toy element according to any of the embodiments disclosed herein.

The secondary signal is a charging zone signal, wherein a position of the interactive toy with respect to the charging zone may be in terms of its placement inside or outside the charging zone, in terms of a distance of the interactive toy from a given point in the charging zone, and/or in terms of an orientation of the toy with respect to the charging zone. Furthermore, the position may also be expressed in terms of absolute coordinates and/or relative coordinates with respect to the charging zone.

The user-perceptible function is selected based on the secondary signal. The output function, which is performed in response to the primary signal, is thus determined subject to the secondary signal. Selection may be performed as a selection of the output function from a set of stored functions and/or may include modification, alteration, or adaptation of a stored function in dependence of information carried by the secondary signal.

By requiring that the user-perceptible function is selected depending on the charging zone signal, the interactive toy is required to control the function device to perform a user-perceptible function in response to both the interaction stimulus signal and the charging zone signal in combination. Thereby, it is achieved that charging of the rechargeable power source in the interactive toy can be intimately integrated into the flow of an ongoing interactive play. Charging thus becomes an integral part of the interactive play experience. Consequently, a continuous or at least extended play experience is naturally achieved, without distracting interruptions due to a power failure in a discharged interactive toy. Thus an improved continuity of the interactive play experience when playing with rechargeable interactive toys, beyond a single recharging cycle, is achieved.

Linking the charging activity to an interactive stimulus has the further advantage of an increased freedom of design of the play experience. Whether or not the actual process of charging, or the fact that charging is required, is made visible to the user can be made up to a play experience designer developing a particular play experience involving one or more interactive toys according to any of the embodiments of the invention disclosed herein. For example, the play experience designer may for educational reasons associate a play story and/or a play scene indicating to the user in one way or another that the interactive toy recharges. Alternatively, the fact that charging is actually going on or required may be integrated, or even hidden, in a play story or play scene design that is directed to different goals.

Furthermore, the intimate integration of the charging process with the play experience also allows for motivating placement of the interactive toy in the charging zones, at least during selected periods in time and/or at some event- or flow-driven points in the course of the play, as a natural part thereof. The motivation may e.g. be driven by achieving in-game rewards, un-locking of special user-perceptible effects or the like when the rechargeable interactive toy is placed in a charging zone or after having rested at or passed through a charging zone.

According to some embodiments, it is even conceivable that the charging process and/or charging state of the interactive toy may be influenced by the play through an interaction stimulus received in the course of the play.

Merely by way of example, an expedition or adventure play experience may be conceived as a game play or a role play where placing additional supplies in a base camp located within a charging zone, e.g. supplies represented by detectable game pieces or further interacting toy elements, may influence the charging of interactive toys representing expedition participants when they come to the base camp. For example, a strategic effort of bringing supplies to the base camp may be rewarded with an increased charging rate, or supplies may parish as a consequence of a catastrophic event, or may be destroyed by hostile monsters.

Further, instead of a standard setting for distribution of charging power to all rechargeable devices serviced by the same charging device, foraging for additional supplies and unlocking these as resources in the game by activating the resources, when a given interactive toy comes to a charging zone, e.g. through interaction with other toys and/or other interactive toys, may give priority access to charging for that given toy over other rechargeable electronic toys placed in the same charging zone ("VIP pass" for charging). In analogy thereto, a given charging zone where the given interactive toy and/or certain unlocked supplies are placed, may be prioritized over other charging zones controlled by the same charging device or charging system. Also, a history of the interactive toy passing over a particularly tough trail or of a particular achievement or task completed may be registered as a primary signal input to the control device. The control device may then be configured, in response to said registered signal, to control a rate of recharging of the interactive toy to simulate a prolonged restitution (reduced charging rate) or a gained power (increased charging rate). It is even conceivable that certain play events reduce a charging state, e.g. a tough expedition trails far away from a charging zone might cause an accelerated discharging.

In another example, a battle, tournament or duelling play experience may be implemented as a game play or a role play where athletes, knights, ninjas or intergalactic warriors, as implemented by interactive toys, compete or fight against each other by way of interaction stimuli exchanged between the interactive toys, and where the outcome of the competition or fight, i.e. the outcome of the interaction is influenced by the charging process or the charging process history: charging may e.g. be camouflaged as training for the acquisition of skills and strength, in preparation to a competition/fight. The training may require a presence of the interactive toy for a given period of time in a charging zone decorated as a school, gym, dojo, castle, or other training place. Such a training session may be registered as a secondary signal with the control circuit of the interactive toy. Access to a competition in an arena or going to battle may be made conditional on acquiring skills/training/recovering in a training or recovery site, which is in fact a charging zone. The secondary signal may then be used in an interaction with a guardian at a portal to give access to an arena where athletic games or a tournament of knights is held, and subsequently to release skills and powers in the form of user-perceptible special effects in response to interaction stimuli (primary signals) received in the course of an interaction with other competing interactive toys. The play experience design may thus motivate to strategically prepare for such competitions, battles, tournaments, or duels by regular training, i.e. charging, at a training site, i.e. within a charging zone.

Further, according to some embodiments, the interactive toy further comprises one or more sensor devices operatively coupled to the control circuit. Thereby a sensor signal can be generated and provided to the control circuit as an input. The control circuit may then be configured to use this input to control an output function, most preferably a user-perceptible function, in response to the sensor signal. Thereby, the interactive functionality of the toy is enhanced. Preferably, the sensor devices are accommodated in the toy housing. An enhanced interactive functionality is thus provided in a self-contained or at least autonomous manner in the interactive toy. Thereby, the interactive toy facilitates an enhanced intuitive play experience by allowing for the intuitive combination of the interactive toy with other toys, in particular with other interactive toys. A naturally creative play experience is thus supported.

Preferably, according to some embodiments, the interactive toy element comprises, accommodated in the toy housing, one or more sensor devices, wherein each sensor device is operatively coupled to the control circuit. The interactive toy is thus equipped to detect relevant events and/or surrounding conditions, and directly to develop signals as input to the control circuit, based on the detected events and/or conditions. Thereby it is achieved that a user of the interactive toy experiences a further enhanced, direct, and intuitive play.

Further, according to some embodiments of the interactive toy, at least a primary sensor device of the one or more sensor devices is adapted to detect an interaction stimulus, to generate a primary signal indicative of the detected interaction stimulus, and to pass said primary signal as an input to the control circuit. Alternatively or in addition thereto, at least a secondary sensor device of the one or more sensor devices is adapted to detect a position of the interactive toy with respect to a charging zone, to generate a secondary signal indicative of the detected position, and to pass said secondary signal as an input to the control circuit.

Advantageously according to some embodiments, the one or more sensor devices of the interactive toy may comprise at least one primary sensor device, at least one secondary sensor device, or preferably at least both a primary and a secondary sensor device, each being operatively coupled to the control circuit as already mentioned. The primary sensor devices are adapted to detect an interaction stimulus, and to generate a signal indicative of the interaction stimulus. The secondary sensor devices are adapted to detect a position of the interactive toy with respect to a charging zone, and to generate a signal indicative of the position of the interactive toy with respect to the charging zone. Thereby an autonomous interactive toy is provided, which allows for direct interaction with the interactive toy, with a user of the toy, a play environment, and/or another interactive toy, as the case may be. Thereby a further enhanced, direct, and intuitive play experience is achieved.

Further, according to some embodiments of the interactive toy the control circuit is configured:
based on the secondary signal, to determine whether the interactive toy is positioned inside the charging zone or outside the charging zone; and,
responsive to the primary signal, to control the function device to perform a first user-perceptible function when the toy is positioned inside the charging zone; and,
responsive to the primary signal, to control the function device to perform a second user-perceptible function, different from the first user-perceptible function, when the interactive toy is positioned outside the charging zone.

Thereby, fundamental interactive play functionality is achieved that is integrated with the charging process in a simple manner. This facilitates the extension of the period of interactive play with the rechargeable interactive toy beyond a single charging cycle in a simple manner, and providing a user and/or a play experience designer with a simple, yet powerful, set of interaction rules, thereby further enhancing the intuitive character of the play experience.

Further, according to some embodiments of the interactive toy, the secondary signal is indicative of a position with respect to one or more of multiple charging zones of a contactless charging device. Further, according to some embodiments of the interactive toy, the secondary signal is further indicative of a position of a further interactive toy according to any of the embodiments disclosed herein with respect to one or more of multiple charging zones of a contactless charging device. Further, according to some embodiments of the interactive toy, the control circuit is configured: based on the secondary signal, to determine whether the interactive toy is positioned in a first one of multiple charging zones or in a second one of the multiple charging zones; and, responsive to the primary signal, to control the function device to perform a first user-perceptible function when the toy is positioned in the first one of the multiple charging zones; and, responsive to the primary signal, to control the function device to perform a second user-perceptible function, different from the first user-perceptible function, when the interactive toy is positioned in the second one of the multiple charging zones. By theses embodiments, a more differentiated user-perceptible function may be selected, and performed in response to interaction with the interactive toy, taking into account the fact that multiple charging zones are available to the user for placing the interactive toys. Thereby an enhanced and more differentiated play experience is achieved. Furthermore, this facilitates a game design that allows for an enhanced versatility and variety of interactions. Furthermore, thereby a game design is facilitated for aligning goals in a play experience with goals of charging the interactive toys.

Further, according to some embodiments of the interactive toy, the user-perceptible function is a time-varying sequence of light emission, sound emission, or a combination thereof. Thereby a large variety of intuitively accessible user-perceptible functions may be designed, initiated by a primary signal, and adapted in dependence of a secondary signal for an enhanced play experience when using embodiments of the present invention.

Further, according to some embodiments of the interactive toy, performance of the user-perceptible function is independent of the actual charging state of the rechargeable power source. The interaction rules may thus be configured more freely, independent of the actual charging state. Consequently, an increased flexibility of the play experience can be achieved. Also, the control circuit may be set up for a simpler set of interaction rules, thereby further enhancing the intuitive character of the play experience. This can also facilitate making technical details of the actual charging state and/or even of the charging process transparent to the user, if that is preferred by a play experience designer. For example, a play experience designer may configure the control circuit with a set of interaction rules that are adapted for uses where such technical detail would be distracting rather than educating (e.g. for the smallest children, or for a story telling or fantasy role play, or for a particular game play). A play experience designer configuring the control circuit for may then instead motivate placement of the interactive toy in a charging zone by different means rooted in the intended specific play experience.

Further, according to some embodiments of the interactive toy, the interaction stimulus is one or more of: a user-generated input to the interactive toy; a sensor signal; and an interaction between the interactive toy and a further toy, such as an interactive toy according to any of the embodiments disclosed herein.

According to some embodiments, the interaction stimulus is a user-generated input to the interactive toy. The control circuit is thus configured to be responsive to user input. This facilitates direct involvement of user action in the play experience.

Alternatively or in addition thereto, according to some embodiments, the interaction stimulus is a sensor signal. Advantageously, the sensor is arranged for interacting with a surrounding play environment, thus collecting an interaction stimulus from the play environment. The control circuit is thus configured to be responsive to the play environment. The performance of a user-perceptible function, or the definition or selection of the user-perceptible function, may thus be based on information gathered directly from the play environment by the interactive toy itself. This facilitates extending the interactive functionality of the interactive toy to include the play environment beyond the interaction with the user, thereby facilitating an enhanced play experience.

Alternatively or in addition thereto, according to some embodiments, the interaction stimulus is an interaction between the interactive toy element and a further toy. The control circuit is thus configured to be responsive to interactions with other toys. The other toys, such as modular toy elements adapted for building toy construction models therefrom, may thus be included in the play, e.g. to change the play environment in a dynamic way, or to represent resources, a task, a selection, a context, a function, or any combination thereof. This facilitates extending the interactive functionality of the interactive toy to include other toys, beyond the interaction with the user or a static play environment alone, thereby facilitating a more dynamic and thus enhanced play experience.

Alternatively or in addition thereto, according to some embodiments, the further toy may be an interactive toy according to any of the embodiments disclosed herein. The control circuit of the interactive toy is thus configured to be responsive to interactions with other interactive toys. This facilitates extending the interactive functionality of the interactive toy to include other interactive toys, beyond the interaction with the user and/or a passive play environment, thereby facilitating an enhanced play experience. In particular, this facilitates directly combining the respective interactive functionalities of multiple interactive toys with each other synergistically to achieve more complex interactive functionalities, and thus a synergistically enhanced play experience, based on the combination of a few interactive toy elements with their respective fundamental interactive functionalities.

Generating a primary signal from such interaction stimuli may include measuring a physical parameter, such as an optical, electrical, or mechanical parameter, associated with any of the above-mentioned interaction stimuli by means of a sensor arrangement. Furthermore, generating a primary signal may also include identifying, e.g. by means of a unique identifier, or otherwise recognizing the source of the interaction stimulus using a sensor arrangement. Furthermore, multiple of the abovementioned interaction stimuli may be combined in the generation of the primary signal.

Further, according to some embodiments of the interactive toy, the interactive toy is adapted for use in a toy construction system comprising a plurality of modular toy elements, wherein the toy housing of the interactive toy comprises coupling members adapted for releasably coupling the interactive toy with modular toy elements of the toy construction system. By providing the housing of the interactive toy with coupling members that are compatible with corresponding coupling members of the modular toy elements of a given toy construction set, the interactive toy becomes an interactive modular toy element, which can be releasably interconnected with the modular toy elements of such a given toy construction set. Using the toy construction set including one or more of such interactive modular toy elements, a toy construction model with interactive functionality can be constructed. As further detailed below, the plurality of modular toy elements of the toy construction system may comprise a plurality of interactive modular toy elements, which may be interconnected to construct a toy construction model combining the interactive functionalities of the individual interactive modular toy elements into a synergistically improved interactive functionality. Alternatively or in addition thereto, the toy construction system may include further, non-interactive modular toy elements, such as passive modular toy elements without any additional functionality beyond the ability to be releasable interconnected by means of coupling members. Adapting the interactive toy for use in a manner compatible with a given toy construction system thus facilitates a flexible, highly creative, and educating play experience.

A further aspect of the invention relates to an interactive toy system including one or more interactive toys according to any of the embodiments as disclosed herein. The system facilitates in an analogous manner a prolonged interactive play experience when playing with rechargeable interactive toys, beyond a single recharging cycle. The system thus achieves at least the analogue advantages as discussed elsewhere herein and in particular with respect to embodiments of the interactive toy.

According to some embodiments, an interactive toy system comprises:
 a charging device defining one or more charging zones; and one or more interactive toys according to any one of the embodiments disclosed herein.

Embodiments of an interactive toy system may comprise different types of interactive toys with respective function devices.

Advantageously according to some embodiments, the interactive toy system comprises at least two charging zones. Thereby, a larger variety of play experiences can be facilitated. Embodiments of an interactive toy system may comprise one or more charging devices, each with respective one or more charging zones.

Further, according to some embodiments, the interactive toy system comprises at least two interactive toys, wherein a first one of the interactive toys is configured to receive an interaction stimulus generated by a second one of the interactive toys, and to develop a primary signal indicative of said interaction stimulus received from the second one of the interactive toys. An interaction between the at least two interactive toys thus depends on the position of the first one of the interactive toys with respect to a charging zone, e.g. whether the first toy is inside or outside the charging zone. Thereby an enhanced variety of play experiences based on the combination of multiple interactive toys can be constructed.

Further, according to some embodiments of the interactive toy system, the interaction stimulus generated by the second one of the interactive toys further depends on the position of the second one of the interactive toys with respect to a charging zone.

Further, according to some embodiments of the interactive toy system, an interaction between first and second ones of the interactive toys further depends on whether the first and second ones of the interactive toys are in the same charging zone or in different charging zones. For example, a stimulus provided to a first interactive toy by a second interactive toy may depend on whether the second interactive toy is in a charging zone, and whether the second interactive toy is in the same charging zone or in a different charging zone.

Advantageously according to some embodiments of the interactive toy system, the interaction stimulus generated by the second one of the interactive toys is a user-perceptible function determined in accordance with a secondary signal in the second one of the interactive toys. The secondary signal in the second one of the interactive toys is indicative of its position with respect to a charging zone (e.g. inside or outside).

As mentioned above, a user of the system may be motivated to place an interactive toy in a charging zone for the purpose of re-charging the rechargeable power sources of the toys, e.g. by a particular structure of the interactive toy system facilitating a reward for placing toys in a charging zone, in the course of the play. For example, the reward may be given as: priority access to charging; an increased charging speed as compared to a standard charging speed or as compared to other interactive toys in the interactive toy system; or enhanced powers of a first interactive toy when interacting with one or more further interactive toys; unlocked user-perceptible functions; or skills, levels, and access rights for participating in play related activities and events; to name just a few. Furthermore, a reward may or may not depend on a charging state of a rechargeable power source in the interactive toy when positioned in the charging zone. By structuring the interaction between two interacting toys according to their respective placement with respect to the one or more charging zones provided in the interactive toy system, a larger variety of play functionalities and scenarios may be devised, which may support or motivate the placement of rechargeable interactive toys in charging zones, as an integrated part of the play. Consequently, a greater flexibility in the design of play experiences is facilitated, all extending the play experience well beyond the limitations of a respective single charging cycle of the interactive toy elements.

Advantageously according to some embodiments, the interactive toy system comprises a plurality of modular toy elements, wherein each of the modular toy elements comprises coupling members configured for detachably interconnecting the modular toy elements with each other, wherein the plurality of modular toy elements comprises at least one or more interactive modular toy elements. As already mentioned above, an interactive modular toy element is an interactive toy according to any of the embodiments disclosed herein, wherein the toy housing is equipped with coupling members that are compatible with corresponding coupling members of any one of the plurality of modular toy elements. By means of the coupling members, the modular toy elements can be interconnected so as to form a toy construction model.

Modular toy elements are thus elements that can be mechanically interconnected by means of coupling members such that a toy construction model can be built in an intuitive manner.

By combining multiple interactive modular toy elements in an ensemble, e.g. within the same model, a wealth of interactive functionalities may be created from even a few, fundamental interactive functions. Interaction between the interactive toy elements in the ensemble facilitates a synergistically enhanced functionality that can be constructed when combining the functions provided by the modular interactive toy elements of the interactive toy system. Thereby, a versatile and flexible system is provided that allows for the creative and intuitive construction of interactive functionalities from a few elements, wherein the composing interactive elements may provide the same or different interactive response, with the same or different user-perceptible functions. Accordingly, not also the model itself, but also the interactive functionality of the model can be constructed in the same modular and intuitive manner as in known toy construction model building systems. Importantly, embodiments of the interactive toy according to the present invention facilitate a prolonged interactive play experience beyond a single charging cycle of each of the rechargeable power sources in the interactive toys. Thereby, the user's creative and playful activity is supported and facilitated in an unprecedented way, since recharging can directly be integrated with the play experience. The user's creative and playful activity is therefore not in the same way interrupted or impeded by an irritating and distracting need for recharging, as it would be the case in the absence of such integration.

Advantageously according to some embodiments, the plurality of modular toy elements of the interactive toy system further comprises one or more passive modular toy elements. The term "passive" as used herein with regard to modular toy elements refers to the absence of additional functionality beyond the mere interconnection by means of the coupling members, in particular to the absence of any electronically enhanced interactive functionality. Modular toy elements of the passive type are thus without any additional functionality beyond mechanical model building, i.e. without electromagnetic functions, electronic functions, display or other optical functions, or the like. By combining passive modular toy elements with interactive modular toy elements that may interchangeably be connected to each other in the same manner, a very intuitive system for toy construction model building is obtained that allows to seamlessly integrate interactive functions with the models thus constructed.

Advantageously according to some embodiments, the interactive toy system may include further types of functional modular toy elements. In particular, according to some embodiments, the interactive toy system further includes further functional modular toy elements without an interactive functionality that is responsive to both a primary, interaction-related signal and a secondary, charging-related input signal in the sense of embodiments of the present invention. Such further functional modular toy elements may comprise modular toy elements with electrical and/or electronic functions e.g. sensor functions, motor functions, indicator functions, lighting functions, user operable input and/or switching functions, data communication, data storage, or combinations thereof. Thereby, a further enhanced interactive toy construction model can be constructed for further seamlessly integrating the interactive functionality with e.g. a sensory, motorized, and/or data functionality in a modular and intuitive manner.

It may be noted that toy construction systems using modular toy elements as building blocks have been known for decades. Over the years, simple box-shaped building blocks have been supplemented with modular toy elements that have a specific appearance or a mechanical or electrical function to enhance the play value of the system. Such functions include e.g. motors, switches, and lamps, but also programmable processors that accept input from sensors and can activate function elements in response to received sensor inputs. By integrating embodiments of interactive toys according to the present invention with such known toy construction systems, the interactive toy elements now also become useful for model construction and may be combined with passive modular toy elements to enhance the play value of toy construction systems, such as the modular toy construction systems that have been known for decades. The functionality and interactive nature of models created from physical modular toy elements may thus be enhanced to the point of being able to animate constructed models to live.

Each modular toy element may comprise a housing. The function device may be accommodated within said housing and/or the energy receipt circuit may be accommodated within said housing. The housing may be box-shaped, e.g. in the form of a relatively flat, plate-like box, e.g. a square or rectangular plate. The housing may define a top face and a bottom face, opposite the top face. The housing may comprise coupling members configured to allow mechanical and detachable attachment of the modular toy element to one or more other modular toy elements of the toy construction system. At least some of the coupling members may extend from the top face. The housing may further comprise one or more side faces extending between the top and bottom faces. In some embodiments, all interactive modular toy elements are configured to be interchangeably and detachably connectable to other modular toy elements of the toy construction system. In particular, the interactive modular toy elements may all have the same size and shape and corresponding coupling members, at least to an extent that they can be interchangeably connected within a toy construction model so as to selectively replace one another at any given position of the toy construction model to which at least one interactive modular toy element can be attached.

Similarly, the energy source device may comprise a housing; and the energy transfer circuit may be accommodated within said housing. Energy transfer zones of the energy source device may be defined by a charging loop arranged internally, i.e. within the housing, and/or or externally, i.e. outside the housing. An external energy transfer zone may have its own housing, and may come in any suitable shape, typically a flat shape allowing for the placement of interactive toys within the energy transfer zone. By way of example, the energy transfer zone may also be integrated in a sheet-shaped housing, such as a stiff sheet-shaped housing, a flexible and/or foldable sheet-shaped housing, or the like. Advantageously, coupling members may be arranged within one or more of the energy transfer zones, be it internal and/or external energy transfer zones. The interactive modular toy elements may thus be releasably be attached to distinct, well-defined locations and in a well-defined orientation with respect to an electromagnetic energy transfer field generated in the energy transfer zone, thereby improving the predictability of the charging process. The housing may be box-shaped as described in connection with the modular toy elements. The housing may comprise one or more coupling members, also as described in connection with the modular toy elements. In some embodiments, the energy source device has the same shape and size as the interactive modular toy elements, at least to an extent that they can be interchangeably connected within a toy construction model so as selectively to replace one another at any given position of the toy construction model.

Each interactive modular toy element and each energy source device may comprise one or more coupling members for detachably attaching the interactive modular toy element or energy source device to other modular toy elements of the toy construction system, e.g. to one or more other interactive modular toy elements and/or to one or more other energy source devices and/or to one or more passive modular toy elements of the toy construction system, i.e. modular toy elements not including function devices, energy transfer circuits, etc. Accordingly, the toy construction system may include a plurality of modular toy elements, the plurality of modular toy elements including a plurality of interactive modular toy elements, one or more energy source devices, and one or more other modular toy elements, in particular, noninteractive modular toy elements, such as conventional modular toy elements, e.g. consisting of a moulded plastic element without any electronic components.

In some embodiments, each modular toy element of the toy construction system and, in particular, each interactive modular toy element and each energy source device, comprises coupling members for detachably interconnecting the modular toy elements with each other to create coherent spatial structures, also referred to as toy construction models. Hence, modular toy elements that have been interconnected with each other by means of the coupling members can again be disconnected from each other such that they can be interconnected again with each other or with other modular toy elements of the system, e.g. so as to form a different spatial structure.

In some embodiments, the modular toy elements are provided with a first and a second type of coupling members, such as coupling pegs and peg-receiving recesses for frictionally engaging the pegs, or other pairs of mating or otherwise complementary coupling members configured to engage each other so as to form a physical connection. One type of coupling members may be located on one side, e.g. the top side, of the modular toy element while another, complementary type of coupling members may be located on an opposite side, e.g. the bottom side, of the modular toy element. In some embodiments, the modular toy elements include pegs extending from the top face of the modular toy element and corresponding peg-receiving cavities extending into the bottom face of the modular toy element for frictionally engaging the pegs by a suitable clamping force. The coupling members may be positioned on grid points of a regular grid; in particular, the coupling members of the modular toy elements may be arranged such that the coupling members of a set of mutually interconnected modular toy elements are positioned on grid points of a three-dimensional regular grid. The dimensions of the modular toy elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

When the coupling members are detachably interconnectable, the user may deconstruct previously built spatial structures and re-use the modular toy elements so as to build new spatial structures. For example, the modular toy elements may be connected to each other by traction/friction or by an interlocking connection.

The modular toy elements may be configured such that two modular toy elements can be connected to a toy construction model such that respective faces of the modular toy elements abut each other, or are at least in close proximity facing each other. To this end, the two modular toy elements may be directly interconnected with each other by means of their respective coupling members or they may both be interconnected with a part of a toy construction model, each directly next to each other.

The system further provides contactless energy transfer between at least the energy source device and the interactive modular toy elements. Consequently, the individual interactive modular toy elements may be made compact and relatively inexpensive. Moreover, in this way, a large variety of functional interactions may be created with relatively few different types of interactive modular toy elements. The compactness and modularity further increases the flexibility in which the interactive modular toy elements can be incorporated into even relatively small toy construction models.

In some embodiments, the housing of an interactive modular toy element and/or of a charging device has a height (excluding the protruding coupling members) of between 3 mm and 10 mm, such as between 3.2 mm and 9.6 mm, such as 3.2 mm or 6.4 mm or 9.6 mm. The length and width of the housing may each be between 5 mm and 35 mm, such as between 8 mm and 32 mm, such as 8 mm, 16 mm, 24 mm or 32 mm. For example, the lateral dimensions may be 16 mm×16 mm or 16 mm×24 mm or 16 mm×32 mm. It will be appreciated, however, that other dimensions may be selected.

A yet further aspect of the invention relates to a method of controlling an interactive toy, the toy comprising a toy housing and, accommodated in said toy housing:
 a function device for performing user-perceptible, controllable functions;
 a control circuit for controlling the function device;
 a rechargeable power source for providing operating power to the function device and the control circuit; and
 a charging circuit for contactless receipt of electrical energy and for charging the rechargeable power source when the interactive toy is positioned in a charging zone of a contactless charging device;

the method comprising the steps of:
 detecting a primary signal indicative of an interaction stimulus;
 detecting a secondary signal indicative of a position of the interactive toy with respect to the charging zone;
 selecting a user-perceptible function based on the secondary signal; and,
 responsive to the primary signal, controlling the function device to perform the selected user-perceptible function.

Furthermore, the skilled person may directly define further advantageous embodiments of the method of controlling the interactive toy and the interactive toy system, by way of analogy, based on the advantageous features as disclosed and discussed herein with respect to any one of the embodiments of an interactive toy and/or of an interactive toy system and their operation, whereby at least the corresponding advantages are achieved.

BRIEF DESCRIPTION OF THE DRAWINGS

Embodiments of the invention will now be described in more detail in connection with the appended drawings, which schematically show in FIG. 1 an interactive toy system according to one embodiment.

DETAILED DESCRIPTION

Figure 1:
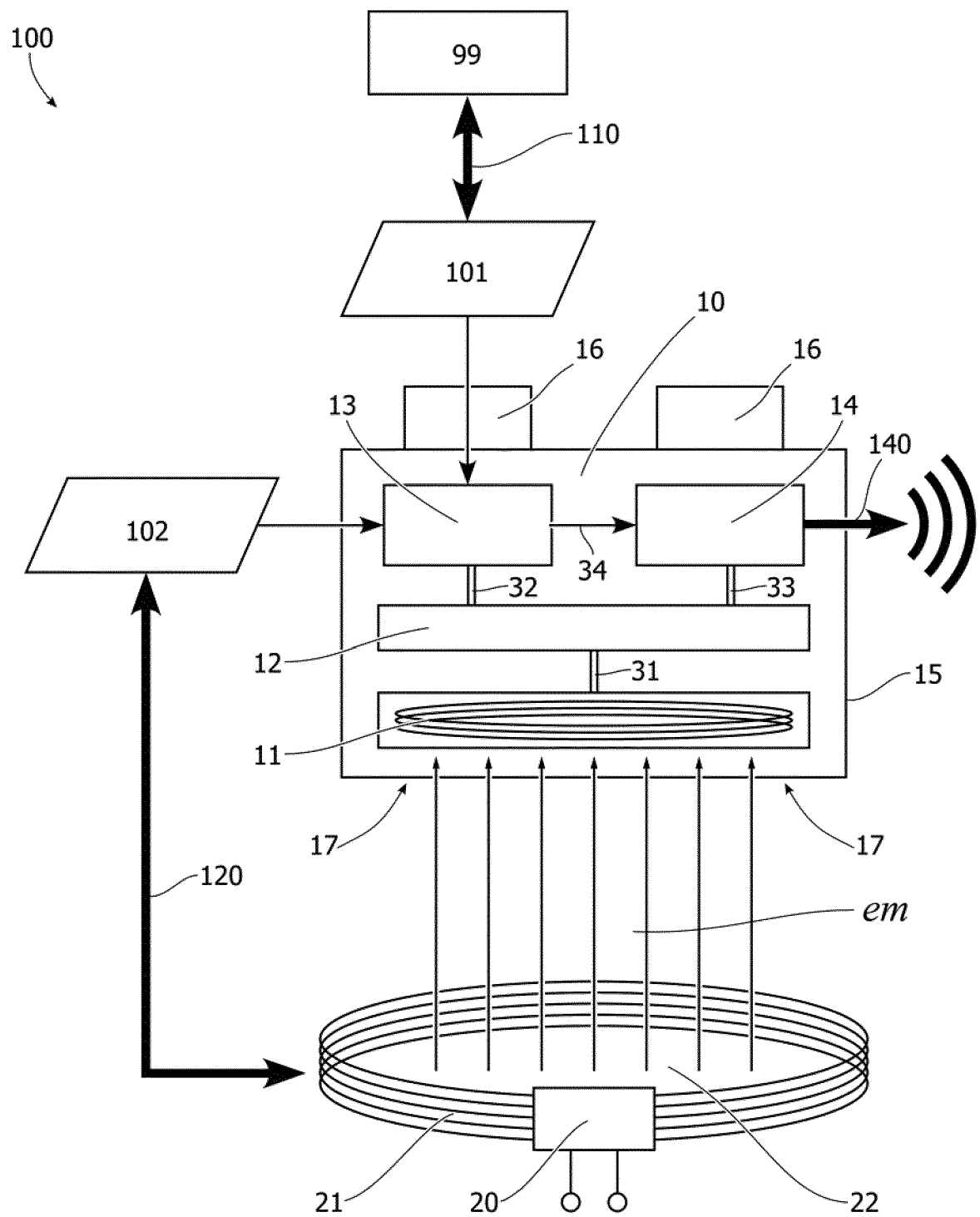

FIG. 1 shows a schematic of an interactive toy system 100 according to one embodiment. The interactive toy system 100 comprises an interactive toy 10 and a charging device 20 with a transmitting coil 21, in the form of conductive loops, defining a charging zone 22. The interactive toy 10 comprises a toy housing 15 and, accommodated in said toy housing 15, a function device 14 for performing user-perceptible, controllable functions 140; a control circuit 13 for controlling the function device 14; a rechargeable power source 12 for providing operating power 32, 33 to the function device 14 and the control circuit 13; and a charging circuit 11 for contactless receipt of electrical energy e-m and for charging (as indicated by reference numeral 31) the rechargeable power source 12 when the interactive toy 10 is positioned in the charging zone 22 of the contactless charging device 20. The control circuit is configured to receive a primary signal 101 indicative of an interaction stimulus 110 from a stimulus source 99; to receive a secondary signal 102 indicative of a position 120 of the interactive toy with respect to the charging zone 22; and, responsive to the primary signal 101, and to produce a control signal 34 based on the primary signal 101 and the secondary signal 102. The control signal is for controlling the function device 14 to perform a user-perceptible function 140, wherein the user-perceptible function 140 is selected based on the secondary signal 102.

As mentioned, according to some embodiments, the primary and/or secondary signals 101, 102 may be generated using sensor devices and/or communication devices, which may be arranged inside or on the toy housing 15. Alternatively or in addition thereto, the primary and/or secondary signals 101, 102 may also be generated by devices that are located elsewhere, and transmitted to the interactive toy 10. The primary signal 101 indicative of an interaction stimulus 110 may also be an analogue and/or digitally encoded remote control signal received from a remote control device as the interaction source 99, e.g. via infrared (IR) or radiofrequency (RF) communication. The remote control device may be a traditional IR or RF remote control device, or in an equivalent manner, a computer or a mobile device, such as a mobile phone or a tablet computer, containing software in the form of programmed instructions for generating an interaction stimulus 110. The interaction stimulus 110 may be generated on the basis of programmed instructions alone, or on the basis of user input through a user interface of the remote control device, mobile device, or computer, etc.

The housing 15 of interactive toy 10 further comprises coupling members 16, 17. The interactive toy 10 may thus be used as a modular toy element adapted to be releasably interconnected with further modular toy elements (not shown here). As mentioned above, this is useful for the use of the interactive toy 10 in constructing toy construction models and/or for the construction of toy construction models with advanced interactive functionality by including a plurality of modular interactive toy elements 10 in such a toy construction model.

Operating the interactive toy system 100, the interactive toy 10 may be controlled to detect a primary signal 101 indicative of an interaction stimulus 110; to detect a secondary signal 102 indicative of a position 120 of the interactive toy 10 with respect to the charging zone 22; to select a user-perceptible function 140 based on the secondary signal 102; and, responsive to the primary signal 101, to control the function device 14 to perform the selected user-perceptible function 140.

Figure 2A:
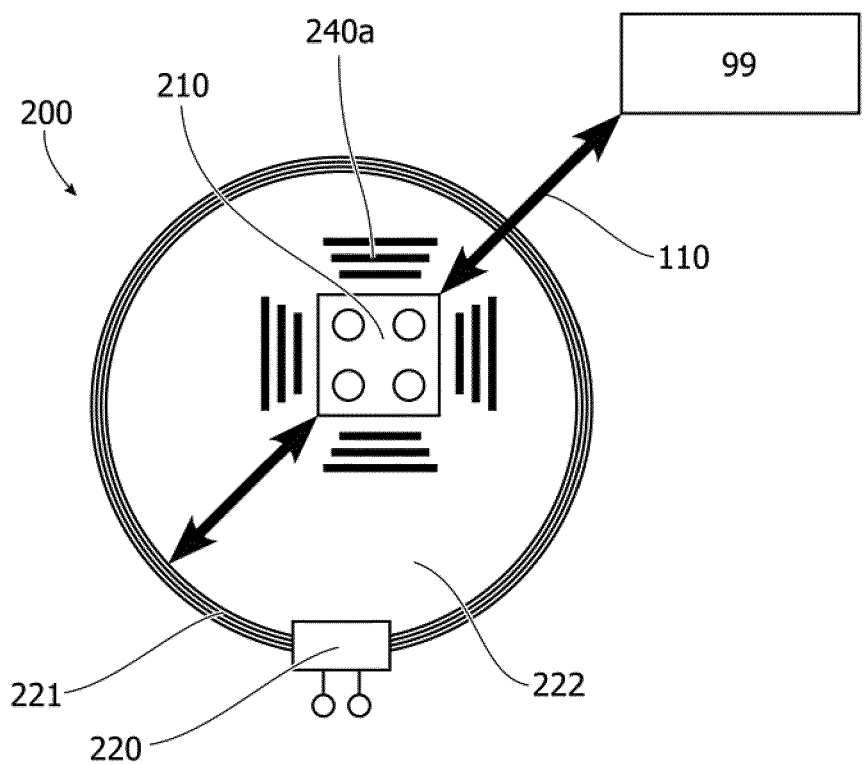
FIGS. 2a, 2b an interactive toy system according to a further embodiment in two different states.
Figure 2B:
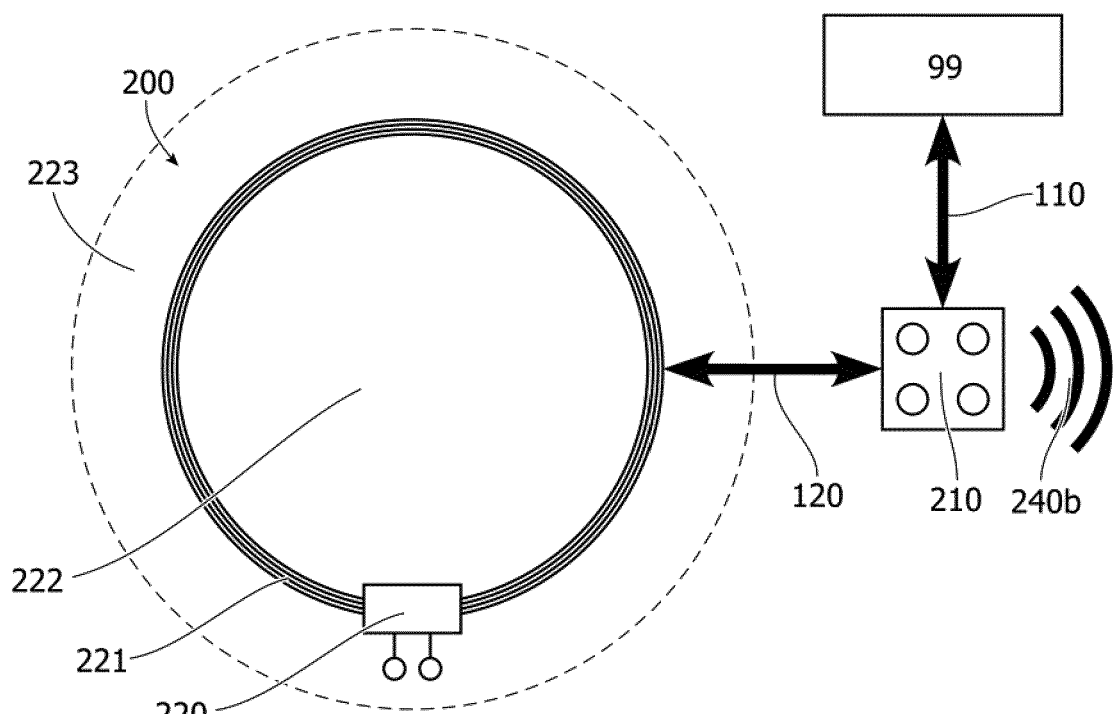

FIGS. 2a, 2b show schematically an embodiment of an interactive toy system 200 with modular interactive toy elements 210 in two different operation scenarios. According to some embodiments, the interactive system 200 may be the embodiment 100 schematically shown in FIG. 1. The interactive toy system 200 may comprise a plurality of interactive toys 210. For the sake of simplicity, only one interactive toy 210 is shown here. The interactive toy system 200 further comprises a charging device 220 with a coiled conductive loop 221 defining a charging zone 222. The interactive toy system 200 may comprise a plurality of charging zones 222. For the sake of simplicity, only one charging zone 222 is shown here. When an interactive toy 210 is placed within the charging zone 222, energy can be transferred from the charging device 220 to the interactive toy 210 in order to charge the rechargeable energy storage device of the interactive toy 210. The interactive toy 210 is configured to detect a primary signal indicative of an interaction stimulus 110 received from an interaction source 99, and a secondary signal indicative of a position 120 of the interactive toy 210 with respect to the charging zone 222. When an interaction stimulus 110 is detected a user perceptible function 240a, 240b of the interactive toy 210 is activated, wherein a first user perceptible function 240a is selected, when the position stimulus 120 indicates that the interactive toy 210 is placed within the charging zone 222 as seen in FIG. 2a; and wherein a second user perceptible function 240b is selected, when the position stimulus 120 indicates that the interactive toy 210 is placed outside the charging zone 222 as seen in FIG. 2b.

The secondary signal 102 indicative of a position 120 of the interactive toy 210 with respect to the charging zone 222 of the charging device 220 may be determined in any suitable manner. In some embodiments, a strength of an electromagnetic field (e.g. above a given threshold), may also be representative of a position 120 of the interactive toy 210 with respect to the charging zone 222. For example, a detected or measured electromagnetic field strength above a first threshold may be equalled to placement within the charging zone 222. In this context, the electromagnetic field strength may also be determined in any suitable manner. For example, a relevant measure for the electromagnetic field strength available for energy transfer from the charging device 220 to the interactive toy 210 may be developed in the charging circuit of the interactive toy 210, on the basis of a detected/measured charging activity. In this way, a detected or measured charging activity may also be used to indicate a position 120 of the interactive toy 210 with respect to the charging device 220, and the secondary signal 102 may be developed on the basis of a detection and/or measurement of a charging activity in the interactive toy 210. By way of example, the first threshold t1 may be determined as a level of the electromagnetic field strength above which an efficient energy transfer from the charging device 220 to the interactive toy 210 is possible. Correspondingly, when no electromagnetic field is detected or when the detected electromagnetic field strength is below a second threshold t2, this may be equalled to a placement outside the charging zone 222. The first and second threshold values may be chosen to coincide: t1=t2. Alternatively, the second threshold t2 may be chosen to be lower than the first threshold t1, t1>t2, and an interval between the first and second threshold values [t1;t2] may be associated with a placement of the interactive toy 210 in the vicinity 223 of the charging zone 222. In this way, a signal 102 indicative of a position 120 of the interactive toy element 210 with respect to the charging zone 222 may be developed even on the basis of a detection or measurement of an electromagnetic field strength and/or a charging activity in the interactive toy 210. Furthermore, according to some embodiments, the interactive toy 210 may communicate with the charging device 220 so as uniquely to identify the charging device 220. Such information may in particular be useful for interactive toy systems 200 comprising further charging zones 222 (not shown in FIGS. 2a, 2b) in order to determine to which one of the plurality of charging zones 222 the detected position stimulus 120 relates. The information identifying the charging zone 222 may then be included when developing the secondary signal, and thus be used when selecting the user-perceptible function 240a, 240b.

Figure 3A:
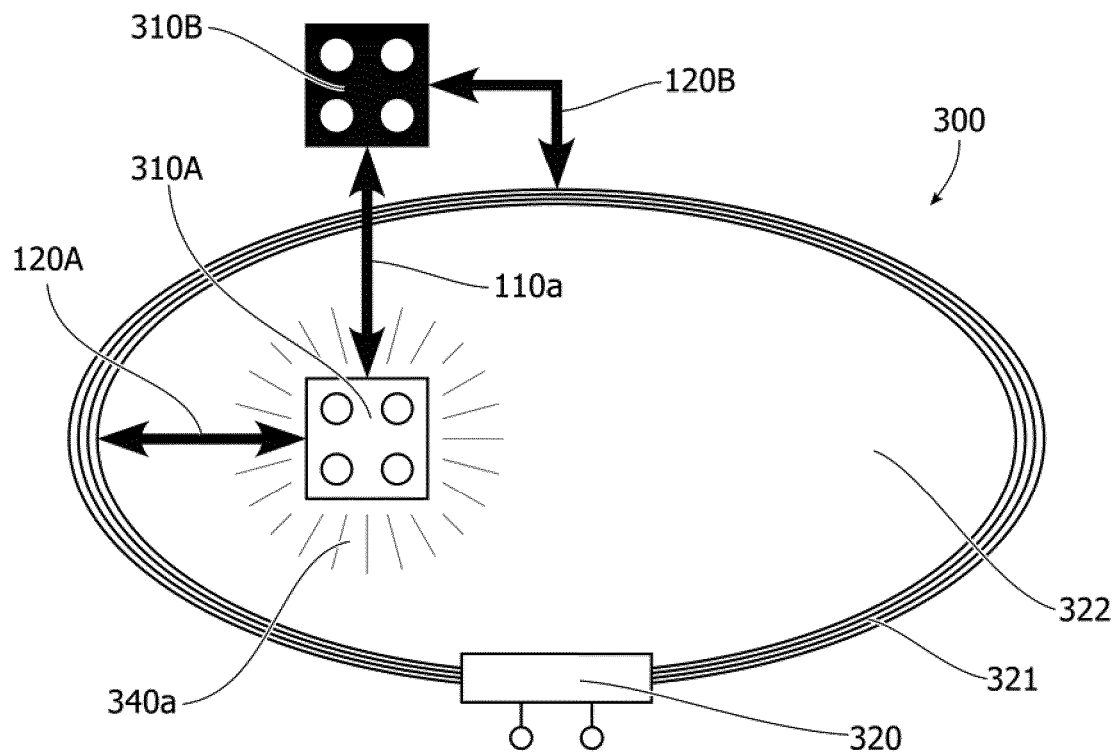
FIGS. 3a, 3b an interactive toy system according to a yet further embodiment in two different states.
Figure 3B:
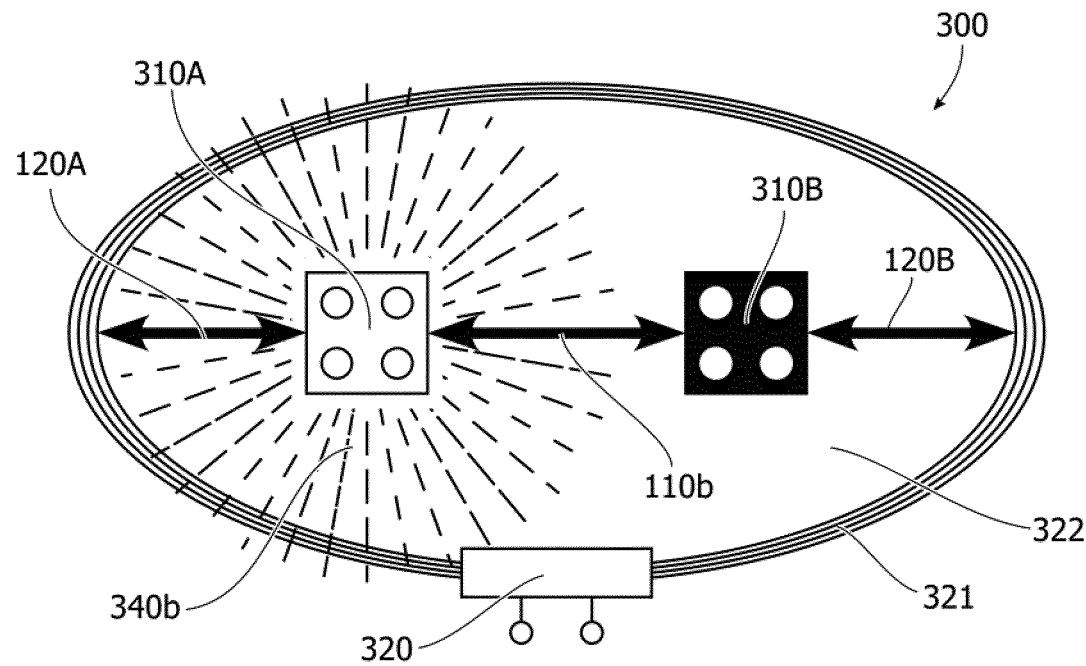

FIGS. 3a, 3b show schematically a further embodiment of an interactive toy system 300 with modular interactive toy elements 310A, 310B. For the sake of simplicity, only two interactive toys 310A, 310B are shown here. The interactive toy system 300 further comprises a charging device 320 with a coiled conductive loop 321 defining a charging zone 322. When the interactive toys 310A, 310B are placed within the charging zone 322, energy can be transferred from the charging device 320 to the interactive toys 310A, 310B in order to charge the rechargeable energy storage device of the interactive toys 310A, 310B. The embodiment of an interactive toy system 300 shown in FIGS. 3a, 3b has all the features of the embodiment of an interactive toy system 200 shown in FIGS. 2a, 2b and as discussed above, with the specific modification that the interaction source 99 now is a second interactive toy 310B.

Referring to FIG. 3a, a first interactive toy 310A is configured to detect a primary signal indicative of an interaction stimulus 110a received from an interaction source.

The first interactive toy 310A is further configured to detect a first secondary signal indicative of a position 120A of the first interactive toy 310A with respect to the charging zone 322. A second interactive toy 310B is also configured to detect a primary signal indicative of an interaction stimulus 110*a* received from an interaction source. The second interactive toy 310B is further configured to detect a second secondary signal indicative of a position 120B of the second interactive toy 310B with respect to the charging zone 322. When an interaction stimulus 110*a* is detected by the first interactive to 310A, a user-perceptible function 340*a* of the interactive toy 310A is activated, wherein the first user-perceptible function 340*a* is selected, when the position 120A indicates that the interactive toy 310A is placed within the charging zone 222 as seen in FIG. 3*a*. As already mentioned, in the embodiment shown in FIGS. 3*a*, 3*b*, the interaction stimulus detected by the first interactive toy 310A is provided by the second interactive toy 310B, wherein the interaction stimulus is selected based on a second secondary signal indicative of the position 120B of the second interactive toy 310B, which in FIG. 3*a* is located outside the charging zone 322.

Now turning to FIG. 3*b*, the second interactive toy 310B may also be placed within the charging zone 322. Based on the detection of the placement 120B of the second interactive toy 310B within the charging zone, a different interaction stimulus 110*b* may be provided to the first interactive toy 310A, resulting in the selection of a second user-perceptible function 340*b*, e.g. a stronger glow of a 'magic crystal', even though the position stimulus 120A indicates that the first interactive toy 310A is still placed inside the charging zone 322 as seen in FIG. 3*b*, since now the interaction stimulus provided by the interaction source has changed. The direct interaction between two interactive toys 310A, 310B may thus be made dependent on different combinations of placing the interactive toys 310A, 310B with respect to the charging zone 322. Furthermore, the change in interaction can be perceived by the user as a change in the user-perceptible function performed by at least one of the interactive toy elements. It may be noted that the second interactive toy may be prompted to provide the interaction stimulus in response to a user interaction therewith, and/or automatically, e.g. in response to an automated detection of the presence of the first interactive toy in its proximity.

Figure 4A:
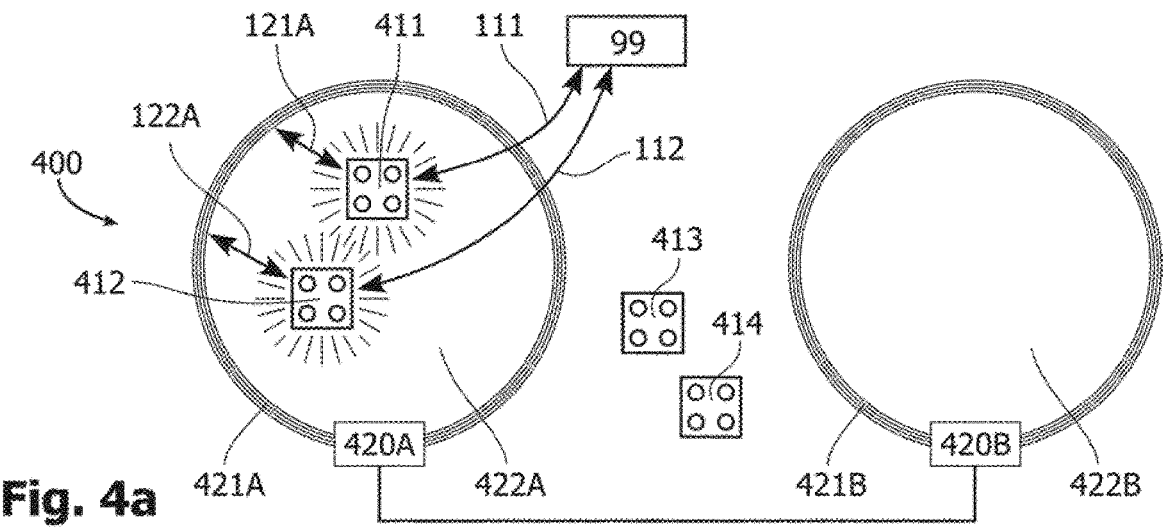
FIGS. 4a, 4b, 4c an interactive toy system according to a yet further embodiment in three different states; and in FIG. 5 an interactive toy system according to a yet further embodiment.
Figure 4B:
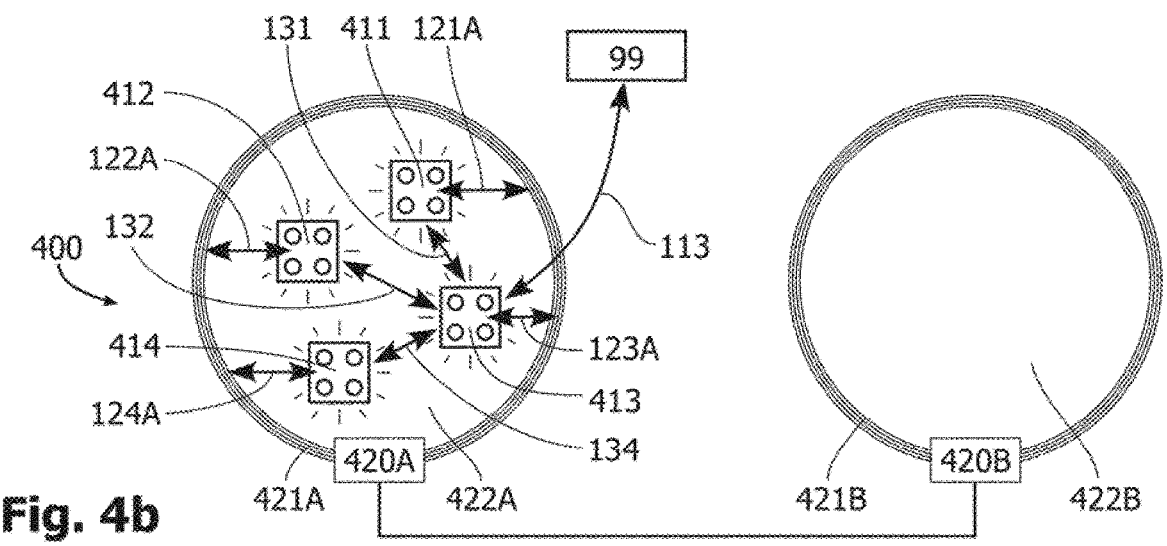
Figure 4C:
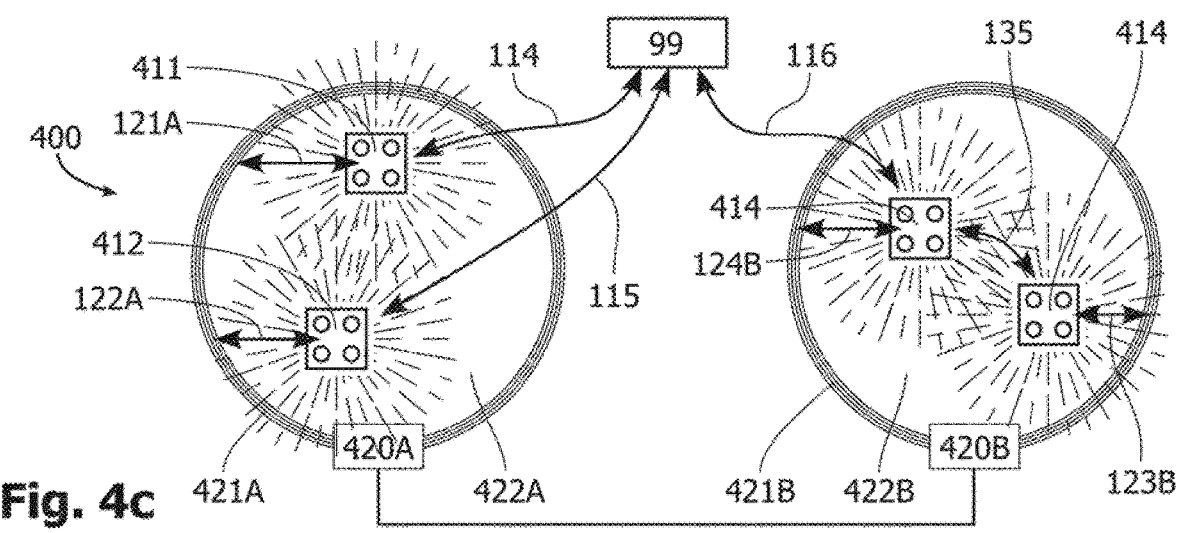

Turning now to FIGS. 4*a-c*, three different states of an interactive toy system 400 with a plurality of interactive toys 411, 412, 413, 414 and multiple charging zones 422A, 422B are described, thereby illustrating how interactive toy systems according to embodiments of the invention generally provide the technical means for facilitating a playfully interactive game design with embedded charging. Interactive toy systems according to embodiments of the invention thus generally provide a game designer with the technical infrastructure required to configure a game for promoting a desired charging behaviour in a manner that is linked to and embedded in the playful physical interaction without disturbing the actual play experience, or even by enhancing the play experience.

As described herein, a user-perceptible output response of the interactive toys is prompted by a primary signal input, wherein the user-perceptible output response is modified according to a secondary signal. Advantageously, the primary signal input is an interaction signal indicative of an interaction stimulus, i.e. a stimulus that originates from a user interaction, an interaction with the environment, or an interaction with another interactive toy. Further, advantageously, the secondary signal is indicative of a position of the interactive toy with respect to one or more charging zones. Thereby, user perceptible output is initiated by an interaction and at the same time linked to charging of the interactive toys of the toy system in one or more of the charging zones.

The interactive toy system 400 schematically shown in FIGS. 4*a-c* comprises modular Interactive toy elements 411, 412, 413, 414 and a charging system with charging devices 420A, 420B with coiled conductive loops 421A, 421B defining respective charging zones 422A, 422B. When the interactive toys 411, 412, 413, 414 are placed within one of the charging zones 422A, 422B, energy can be transferred from the corresponding charging device 420A, 420B to the interactive toys 411, 412, 413, 414 in order to charge the rechargeable energy storage device of the interactive toys 411, 412, 413, 414. The embodiment of an interactive toy system 400 shown in FIGS. 4*a-c* has all the features of the embodiment of an interactive toy system 200 shown in FIGS. 2*a*, 2*b* and as discussed above, with the specific modification that the system is now shown with a plurality of modular interactive toy elements (here four, by way of example) 411, 412, 413, 414 and multiple charging zones 422A, 422B (here two, by way of example). Again, by way of example, the interactive toy elements 411, 412, 413, 414 are capable of emitting light as a user-perceptible output, wherein the light emission may be modified in intensity, colour, and a combination thereof, which furthermore may be provided as a time varying sequence. The light output of the interactive toy elements 411, 412, 413, 414 may be controlled by a control circuit to provide the user-perceptible (here visible) output responsive to a primary signal received at the control circuit, wherein the user-perceptible output may be modified according to a function that is selected based on a secondary signal received at the control circuit.

As schematically shown in FIG. 4A, a user 99 may pick up and place two of the interactive toy elements 411, 412 in a first charging zone 422A. The user's 99 interaction of picking up and placing selected ones of the interactive toy elements 411, 412 in the first charging zone 420A may be detected as interaction stimulus 111, 112, and corresponding primary signals indicative of said interaction stimulus 111, 112 may be developed. Furthermore, the new position 121A, 122A of the interactive toy elements 411, 412 inside the first charging zone 422A may be detected, and a secondary signal indicative of said position 121A, 122A at a location inside the first charging zone 422A may be developed. Receiving the primary signal the interactive toy elements 411, 412 are prompted to produce light output upon the user interactions 111, 112. Further receiving the secondary signal, the light output is generated according to a function, which is determined based on the secondary signal. For example, in response to the primary signal, the light emitters in interactive toy elements 411, 412 are controlled to emit light, wherein the light emission is selected to be a "moderate intensity" based on the secondary signal. In a game context overlay, the moderate intensity may be associated with a "magic glow" of the interactive toy elements representing "crystal assets" evoked by the user-interaction of picking up and placing the interactive toy elements 411, 412 in the charging zone representing a "magic source" in the game. Using this control infrastructure a game designer may thus align the user-perceptible output required for an interactive play experience with the requirement for motivating a continued charging of the interactive toy elements as an embedded part of the interactive play with the toy elements. The interaction stimulus may be detected, for example, by means of suitable detection devices arranged in the housing of the selected interactive toy elements 411, 412, e.g. by means of a touch sensor, a proximity sensor, a gyroscopic sensor, an acceleration sensor, an optical sensor, a magnetic sensor, and/or an inductive sensor with a pick-up coil arrangement in the toy element's 411, 412 housing. Furthermore, the position with respect to at least one of the multiple charging zones may be detected, for example, by means of suitable detection devices arranged in the housing of the interactive toy elements 411, 412, e.g. by means of a touch sensor, a proximity sensor, a gyroscopic sensor, an acceleration sensor, an optical sensor, a magnetic sensor, and/or an inductive sensor with a pick-up coil arrangement in the toy element's 411, 412 housing. The remaining interactive toy elements 413, 414 rest without detected interaction. Accordingly, no user-perceptible function is initiated, as shown in FIG. 4A. However, it is further conceivable that the selected interactive toy elements 411, 412 when placed inside the charging zone, besides the user-perceptible output, also broadcast an interaction stimulus directed to the remaining interactive toy elements 413, 414, thereby developing a primary signal for the remaining interactive toy elements 413, 414 (not shown). The primary signal is indicative of an interaction stimulus received by the remaining interactive toy elements 413, 414 from the selected interactive toy elements 411, 412. Reception of the primary signal may again initiate emission of a user-perceptible output. The interactive toy elements may further detect that they are positioned outside any of the charging zones 422A, 422B of the toy system, thereby developing a secondary signal for the remaining interactive toy elements 413, 414 (not shown). The secondary signal is indicative of the position of the remaining interactive toy elements 413, 414 with respect to the charging zones 422A, 422B. The secondary signal may then be used to determine a user-perceptible output function for the interactive toy elements 413, 414 remaining outside the charging zones 422A, 422B, which is different from the user-perceptible output function used for the selected interactive toy elements 411, 412 that are placed inside the first charging zone 422A. For example, the remaining interactive toy elements 413, 414 may attract the user's attention by a faint pulsating light emission (not shown here), thereby indicating that they are also "magic crystals" which can be activated in a "magic circle".

FIG. 4B shows the interactive toy system in a state where the user 99 has placed all interactive toy elements 411, 412, 413, 414 in the first charging zone 422A. The user's interaction stimulus is indicated by arrow 113, e.g. placing the interactive toy element 413 as the last one to join the interactive toy elements 411, 412, 414 already present in the first charging zone 422A. Detection, e.g. by interactive toy element 413, of the proximity of the other interactive toy elements 411, 412, 414 may cause an interaction between interactive toy element 413 and the other interactive toy elements 411, 412, 414, which may be detected as interaction stimulus 131, 132, 134 and used to develop a primary signal indicative of that interaction at the other interactive toy elements 411, 412, 414. The interactive toy elements 411, 412, 413, 414 may further develop respective secondary signals indicative of their position 121A, 122A, 123A, 124A within the first charging zone 422A. Thus inferring that all interactive toy elements 411, 412, 413, 414 are located inside the same charging zone 422A, while a further charging zone 422B is available, the user-perceptible output function initiated by the primary signal may then be adapted based on the respective secondary signals, e.g. by reducing the light emission intensity from "moderate intensity" to "low intensity", thereby indicating to the user that a less desirable state has been produced.

FIG. 4C shows the interactive toy system in a further state with a different, more even distribution of the interactive toy elements 411, 412, 413, 414 over the available charging zones 422A, 422B, where two of the interactive toy elements 411, 412 are placed in the first charging zone 422A as indicated by position arrows 121A and 122A, respectively, and where two further ones of the interactive toy elements 413, 414 are placed in the second charging zone 422B as indicated by position arrows 123B and 124B, respectively. From a charging point of view an even distribution of the interactive toy elements over the charging zones, or more generally a distribution according to a predetermined scheme, for example reflecting the charging capacity of the different charging zones, may e.g. be desirable in order to achieve a good load balance across the different charging devices 420A, 420B of the charging system. Generally, the control circuits of the interactive toy construction elements may thus be configured to take into account such a distribution scheme. Advantageously, the distribution scheme is conditioned by a charging capacity of the charging devices of the toy system. In simple embodiments, the distribution scheme may be predetermined, e.g. according to a predetermined charging capacity of the charging devices. Alternatively or in addition thereto, the distribution scheme may be determined dynamically, e.g. in response to a current load of the charging device where a given interactive toy element is placed, and including information indicative of said current load in the secondary signal. User interactions 114, 115, 116 and inter-element interactions, such as interaction 135 may then initiate a user-perceptible function to be produced by the interactive toy elements 411, 412, 413, 414, wherein the function is adapted according to the secondary signal as developed based on the determined position information 121A, 122A, 123B, 124B. In response to this state, the control circuits of the interactive toy elements 411, 412, 413, 414 may then be configured to control the light emission to an increased intensity ("high intensity") as compared to both the first state shown in FIG. 4A and the second state shown in FIG. 4B. In the interactive play, the increased intensity may reflect a "more powerful magic" being activated by occupying more "magic circles". Thereby a status with respect to a desired distribution of the plurality of interactive toys over the multiple charging zones can be indicated to the user. A game designer may thus configure the toy system to align the requirement for a load-balanced use of the charging system with the goals of the interactive play, thereby motivating an optimized continued charging of the interactive toy elements during the play without compromising the user's interactive play experience.

As indicated in all embodiments shown, the interactive toy elements advantageously are modular interactive toy elements comprising cooperating coupling elements and can be assembled to form a toy construction model, which may include further modular toy elements, such as passive or non-interactive functional modular toy elements to enhance the model building experience. According to some embodiments of the interactive toy system, any one of building related interactions, i.e. interactions related to the model building and construction play may be detected and used as interaction stimulus from which a primary signal may be developed. For example, such building and construction play related interactions may include connecting and/or disconnecting modular toy elements to construct an/or modify a toy construction model, detection of a vicinity, of a proximity, and/or of a fixed spatial relation with respect to other interactive, passive or non-interactive functional modular toy elements.

Figure 5:
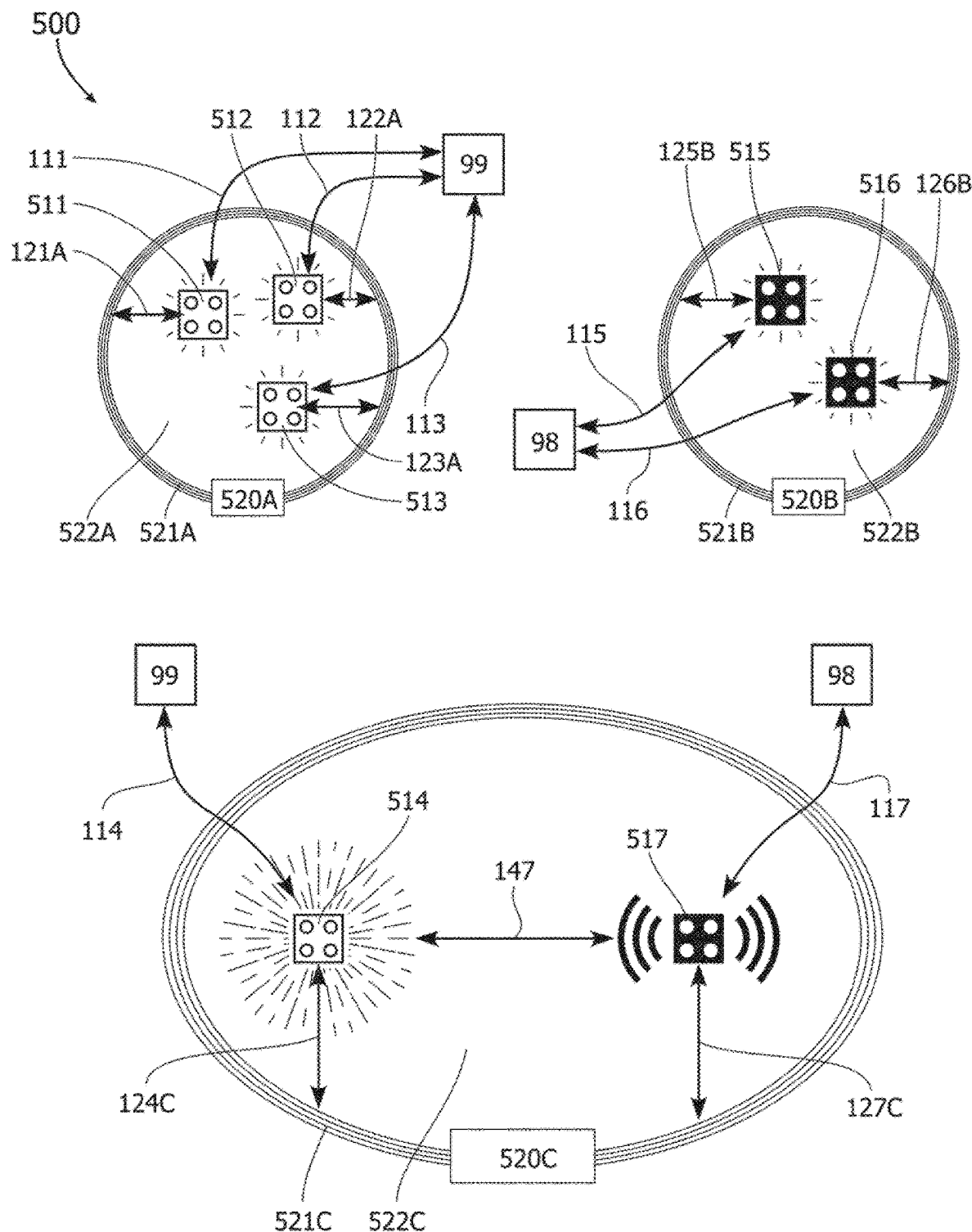

In a yet further embodiment, shown in FIG. 5, an interactive toy system 500 comprises a first charging device 520A, a second charging device 520B, a third charging device 520C, a first set of interactive toy elements 511, 512, 513, 514 associated with a first user 99, and a second set of interactive toy elements 515, 516, 517 associated with a second user 98. The first, second and third charging devices 520A, 520B, 520C each have respective first, second and third inductive loops 521A, 521B, 521C defining corresponding charging zones 522A, 522B, 522C.

Interactive toy elements 511, 512, 513 of the first set may be placed inside the first charging zone 520A. The first user 99 may interact with each of the interactive toy elements 511, 512, 513 in the first charging zone 520A, thus providing an interaction stimulus 111, 112, 113 from which a primary signal may be developed. A respective secondary signal is developed for each of the interactive toy elements based on their positions 121A, 122A, 123A in the first charging zone 522A. The positions 121A, 122A, 123A may further reflect a distance from the wiring of the loop 521A and may e.g. rely on sensing an inductive coupling between a pick-up coil arrangement in each of the interactive toy elements 511, 512, 513 and the inductive loop 521A, which may depend on said distance. The primary signal may then initiate a user-perceptible function, wherein the function is determined according to the secondary signal.

For example, interaction stimulus 111, 112, 113 is a physical handling of the toy construction elements according to a recognizable predetermined pattern, which in a playing context mimics a nurturing and training of playable characters, such as dragons, represented by the toy construction elements, or a model build therefrom. Position information 121A, 122A, 123A may indicate that the toy construction elements 511, 512, 513 are placed within the first charging zone 522A, which in the playing context may represent a first training base for the dragons of the first user 99. In addition thereto, the position information may indicate a distance of the interactive toy elements from the windings of the first inductive loop 521 A, and/or vary with an inductive coupling strength as mentioned above, which thus may reflect a charging efficiency. The user-perceptible function may then be a faint glow if the position 111, 112, 113 (e.g. of a dragon model) is determined as inside the first charging loop (e.g. the dragon model's training base), thereby indicating in the above-mentioned play context that the interactive toy (dragon) thrives and strengthens under the user's interaction with the respective interactive toy elements, e.g. representing care and training of the dragon. In so far the position signal carries further detailed information, such as a distance from a predetermined position for efficient charging, the secondary signal may reflect this information and the output function may be adjusted accordingly, e.g. by varying the strength of the faint glow according to said distance.

A further interactive toy element 514 of the first set may be placed inside the third charging zone 520C. The first user 99 may interact with the interactive toy element 514 in the third charging zone 520C, thus providing an interaction stimulus 114 from which a primary signal may be developed. A respective secondary signal is developed, which is indicative of the position 124C of the interactive toy element 514 in the third charging zone 522C. Initiated by the primary signal indicative of the user's 99 interaction stimulus 114, a user-perceptible function may then be performed by the interactive toy element 514, wherein the user-perceptible function is selected based on the secondary signal indicating that the interactive toy element is now within the third charging zone 522C (rather than in any one of the first and second charging zones 522A, 522B). The user perceptible function in the third charging zone 522C may be selected to be significantly different from the user-perceptible functions that are selected when the interactive toy elements are placed in the first or second charging zones 522A, 522B. For example, the interactive toy element 514 when placed inside the third charging zone may now produce a vibrant colour and high intensity light emission in response to the interaction stimulus 114. In the above-mentioned play context, the third charging zone 522C may represent a battle arena, and the physical interaction stimulus 114 may mimic the dragons impressive posing and moves before and during battling.

Interactive toy elements 515, 516, 517 of the second set associated with user 98 may be configured in an analogous manner. In the state of the interactive toy system 500 shown in FIG. 5. Interactive toy elements 515, 516 are placed inside the second charging zone 520B, where the second user 98 may interact with each of the interactive toy elements 515, 516 in the second charging zone 520B, thus providing an interaction stimulus 115, 116 from which a primary signal may be developed. A respective secondary signal is developed for each of the interactive toy elements 515, 516 based on their positions 125B, 126B in the charging zone 522B. Furthermore, the interactive toy element 517 of the second set is placed inside the third charging zone 520C. The second user 98 may interact with the interactive toy element 517 in the third charging zone 520C, thus providing an interaction stimulus 117 from which a primary signal may be developed. A respective secondary signal is developed, which is indicative of the position 127C of the interactive toy element 517 in the third charging zone 522C. Again, a user-perceptible function may then be performed by the interactive toy element 517, which is initiated by the primary signal indicative of the user's 98 interaction stimulus 117, wherein the user-perceptible function is selected based on the secondary signal indicating that the interactive toy element 517 is now within the third charging zone 522C. As for the first set of interactive toy elements, the second set of interactive toy elements may perform a significantly different user-perceptible function when placed in the third charging zone 522C, as compared to being placed in one of the first and second charging zones 522A, 522B.

The interactive toy system thereby facilitates a combined nurturing/training and competitive battling play experience with multiple players using at least a first set of interactive toy elements 511, 512, 513, 514 and a second set of interactive toy elements 515, 516, 517 in combination with multiple charging zones 522A, 522B, 522C. Exploiting the infrastructure according to embodiments of the invention the game designer is thus enabled to align goals of the play experience with goals of continued charging, thereby facilitating continued play with the interactive toy elements for durations beyond single charging cycles of the interactive toy elements.

The invention claimed is:

1. An interactive toy, comprising a toy housing and, accommodated in said toy housing:
   a function device for performing user-perceptible, controllable functions;
   a control circuit for controlling the function device, wherein the control circuit is configured to receive a primary signal indicative of an interaction stimulus;

a rechargeable power source for providing operating power to the function device and the control circuit; and a charging circuit for contactless receipt of electrical energy and for charging the rechargeable power source when the interactive toy is positioned in a charging zone of a contactless charging device;

wherein the interactive toy further comprises one or more sensor devices operatively coupled to the control circuit;

wherein the control circuit is further configured to:
receive a secondary signal indicative of a position of the interactive toy with respect to the charging zone; and,
responsive to the primary signal, control the function device to perform a user-perceptible function, wherein the user-perceptible function is selected based on the secondary signal.

2. The interactive toy according to claim 1, wherein the one or more sensor devices are accommodated in or on the toy housing.

3. The interactive toy according to claim 1, wherein at least a primary sensor device of the one or more sensor devices is adapted to detect an interaction stimulus, to generate a primary signal indicative of the detected interaction stimulus, and to pass said primary signal as an input to the control circuit; and/or wherein at least a secondary sensor device of the one or more sensor devices is adapted to detect a position of the interactive toy with respect to a charging zone, to generate a secondary signal indicative of the detected position, and to pass said secondary signal as an input to the control circuit.

4. The interactive toy according to claim 1, wherein the control circuit is configured:
based on the secondary signal, to determine whether the interactive toy is positioned inside the charging zone or outside the charging zone; and,
responsive to the primary signal, to control the function device to perform a first user-perceptible function when the toy is positioned inside the charging zone; and,
responsive to the primary signal, to control the function device to perform a second user-perceptible function, different from the first user-perceptible function, when the interactive toy is positioned outside the charging zone.

5. The interactive toy according to claim 1, wherein the secondary signal is indicative of a position with respect to one or more of multiple charging zones of a contactless charging device.

6. The interactive toy according to claim 5, wherein the secondary signal is further indicative of a position of an additional interactive toy with respect to one or more of multiple charging zones of a contactless charging device.

7. The interactive toy according to claim 1, wherein the control circuit is configured:
based on the secondary signal, to determine whether the interactive toy is positioned in a first one of multiple charging zones or in a second one of the multiple charging zones; and,
responsive to the primary signal, to control the function device to perform a first user-perceptible function when the toy is positioned in the first one of the multiple charging zones; and,
responsive to the primary signal, to control the function device to perform a second user-perceptible function, different from the first user-perceptible function, when the interactive toy is positioned in the second one of the multiple charging zones.

8. The interactive toy according to claim 1, wherein the user-perceptible function is a time-varying sequence of light emission, sound emission, or a combination thereof.

9. The interactive toy according to claim 1, wherein performance of the user-perceptible function is independent of the actual charging state of the rechargeable power source.

10. The interactive toy according to claim 1, wherein the interaction stimulus is one or more of: a user generated input to the interactive toy; a sensor signal; and an interaction between the interactive toy and an additional interactive toy.

11. The interactive toy according to claim 1, wherein the interactive toy is adapted for use in a toy construction system comprising a plurality of modular toy elements, wherein the toy housing of the interactive toy comprises coupling members adapted for releasably coupling the interactive toy with modular toy elements of the toy construction system.

12. An interactive toy system comprising:
a charging device defining one or more charging zones; and
one or more interactive toys according to claim 1.

13. The interactive toy system according to claim 12, wherein the interactive toy system comprises at least two interactive toys, wherein a first one of the interactive toys is configured to receive an interaction stimulus generated by a second one of the interactive toys, and to develop a primary signal indicative of said interaction stimulus received from the second one of the interactive toys.

14. The interactive toy system according to claim 13, wherein the interaction stimulus generated by the second one of the interactive toys further depends on the position of the second one of the interactive toys with respect to a charging zone.

15. The interactive toy system according to claim 13, wherein an interaction between the first one of the interactive toys and the second one of the interactive toys further depends on whether the first one of the interactive toys and second one of the interactive toys are in the same charging zone or in different charging zones.

16. A method of controlling an interactive toy, the interactive toy comprising a toy housing and, accommodated in said toy housing:
a function device for performing user-perceptible, controllable functions;
a control circuit for controlling the function device;
a rechargeable power source for providing operating power to the function device and the control circuit; and
a charging circuit for contactless receipt of electrical energy and for charging the rechargeable power source when the interactive toy is positioned in a charging zone of a contactless charging device;

wherein the interactive toy further comprises one or more sensor devices operatively coupled to the control circuit;

wherein the method comprises:
detecting a primary signal indicative of an interaction stimulus;

wherein the method further comprises:
detecting a secondary signal indicative of a position of the interactive toy with respect to the charging zone;
selecting a user-perceptible function based on the secondary signal; and,
responsive to the primary signal, controlling the function device to perform the selected user-perceptible function.

* * * * *